US012103330B2

(12) United States Patent
Jourden et al.

(10) Patent No.: US 12,103,330 B2
(45) Date of Patent: Oct. 1, 2024

(54) SHARPENERS FOR WRITING INSTRUMENTS

(71) Applicant: Sanford L.P., Atlanta, GA (US)

(72) Inventors: Michael Alan Jourden, Smyna, GA (US); Sarah Morgan Gorlick, Brooklyn, NY (US); Daniel Patrick Sedlecky, Cumming, GA (US)

(73) Assignee: Sanford, L.P., Atlanta, GA (US)

( * ) Notice: Subject to any disclaimer, the term of this patent is extended or adjusted under 35 U.S.C. 154(b) by 0 days.

(21) Appl. No.: 17/767,390

(22) PCT Filed: Oct. 7, 2020

(86) PCT No.: PCT/US2020/054520
§ 371 (c)(1),
(2) Date: Apr. 7, 2022

(87) PCT Pub. No.: WO2021/071905
PCT Pub. Date: Apr. 15, 2021

(65) Prior Publication Data

US 2024/0075766 A1 Mar. 7, 2024

Related U.S. Application Data

(60) Provisional application No. 62/913,963, filed on Oct. 11, 2019.

(51) Int. Cl.
*B43L 23/02* (2006.01)
*B43L 23/00* (2006.01)

(52) U.S. Cl.
CPC ............ *B43L 23/008* (2013.01); *B43L 23/02* (2013.01)

(58) Field of Classification Search
CPC ........... B43L 23/02; B43L 23/06; B43L 23/08
See application file for complete search history.

(56) References Cited

U.S. PATENT DOCUMENTS

| | | | | |
|---|---|---|---|---|
| 2,338,263 | A | 1/1944 | Schaefer | |
| 3,937,239 | A * | 2/1976 | Bosland | B43L 23/02 144/28.5 |
| 6,886,614 | B2 * | 5/2005 | Ricono | B43L 23/02 30/453 |
| 8,205,648 | B2 * | 6/2012 | Hsu | B43L 23/008 144/28.72 |

(Continued)

OTHER PUBLICATIONS

International Search Reported Dated Jan. 21, 2021.
International Preliminary Report on Patentability Dated Oct. 26, 2021.

*Primary Examiner* — Matthew Katcoff
(74) *Attorney, Agent, or Firm* — Eversheds Sutherland (US) LLP

(57) ABSTRACT

A sharpener for a writing instrument includes a receptacle, an entry assembly, and a cutter assembly. The entry assembly is coupled to the receptacle and defines an instrument opening. The entry assembly is configured to receive an end of the writing instrument through the instrument opening along an entry axis. The cutter assembly is configured to revolve about the entry axis in engagement with the entry assembly to sharpen the end of the writing instrument. The cutter assembly is removably engageable with the entry assembly at least by relative translation between the cutter assembly and the receptacle along the entry axis.

19 Claims, 11 Drawing Sheets

(56) References Cited

U.S. PATENT DOCUMENTS

| | | | |
|---|---|---|---|
| 9,475,336 | B2 | 10/2016 | Huang |
| 9,555,661 | B2 * | 1/2017 | Cheng ..................... B43L 23/02 |
| 9,969,207 | B2 * | 5/2018 | Chen ..................... B43L 23/008 |
| 11,040,568 | B1 * | 6/2021 | Hanson ................... B43L 23/08 |
| 2003/0213530 | A1 | 11/2003 | Ricono et al. |
| 2010/0175788 | A1 | 7/2010 | Yeh et al. |
| 2010/0212781 | A1 | 8/2010 | Farnworth et al. |
| 2013/0186517 | A1 | 7/2013 | Cheng et al. |
| 2017/0361640 | A1 | 12/2017 | Kim et al. |
| 2019/0126664 | A1 | 5/2019 | Itoi |

* cited by examiner

SHARPENERS FOR WRITING INSTRUMENTS

CROSS REFERENCE TO RELATED APPLICATIONS

This application is a 35 U.S.C. § 371 national stage application of PCT Patent Application No. PCT/US2020/054520, filed Oct. 7, 2020, which claims priority benefit of U.S. Provisional Application No. 62/913,963, filed Oct. 11, 2019, the disclosures of which are incorporated by reference herein in their entireties.

BACKGROUND

1. Technical Field

The present disclosure relates generally to sharpeners for writing instruments.

2. Description of the Related Art

Sharpeners may be used for sharpening writing instruments. Sharpeners may include a cutter assembly. The cutter assembly may be surrounded by a cage. Sharpeners may have a generally horizontal or vertical configuration, with writing instruments directed horizontally or vertically into an opening of the sharpener to contact the cutter assembly.

SUMMARY

The present disclosure describes sharpeners for writing instruments. Sharpeners according to the present disclosure may be used to sharpen writing instruments and securely retain shavings in a receptacle, while allowing access to cutter assembly for cleaning or maintenance.

In embodiments, a sharpener for a writing instrument includes a receptacle, an entry assembly, and a cutter assembly. The entry assembly is coupled to the receptacle and defines an instrument opening. The entry assembly is configured to receive an end of the writing instrument through the instrument opening along an entry axis. The cutter assembly is configured to revolve about the entry axis in engagement with the entry assembly to sharpen the end of the writing instrument. The cutter assembly is removably engageable with the entry assembly at least by relative translation between the cutter assembly and the receptacle along the entry axis.

Figure 1A:
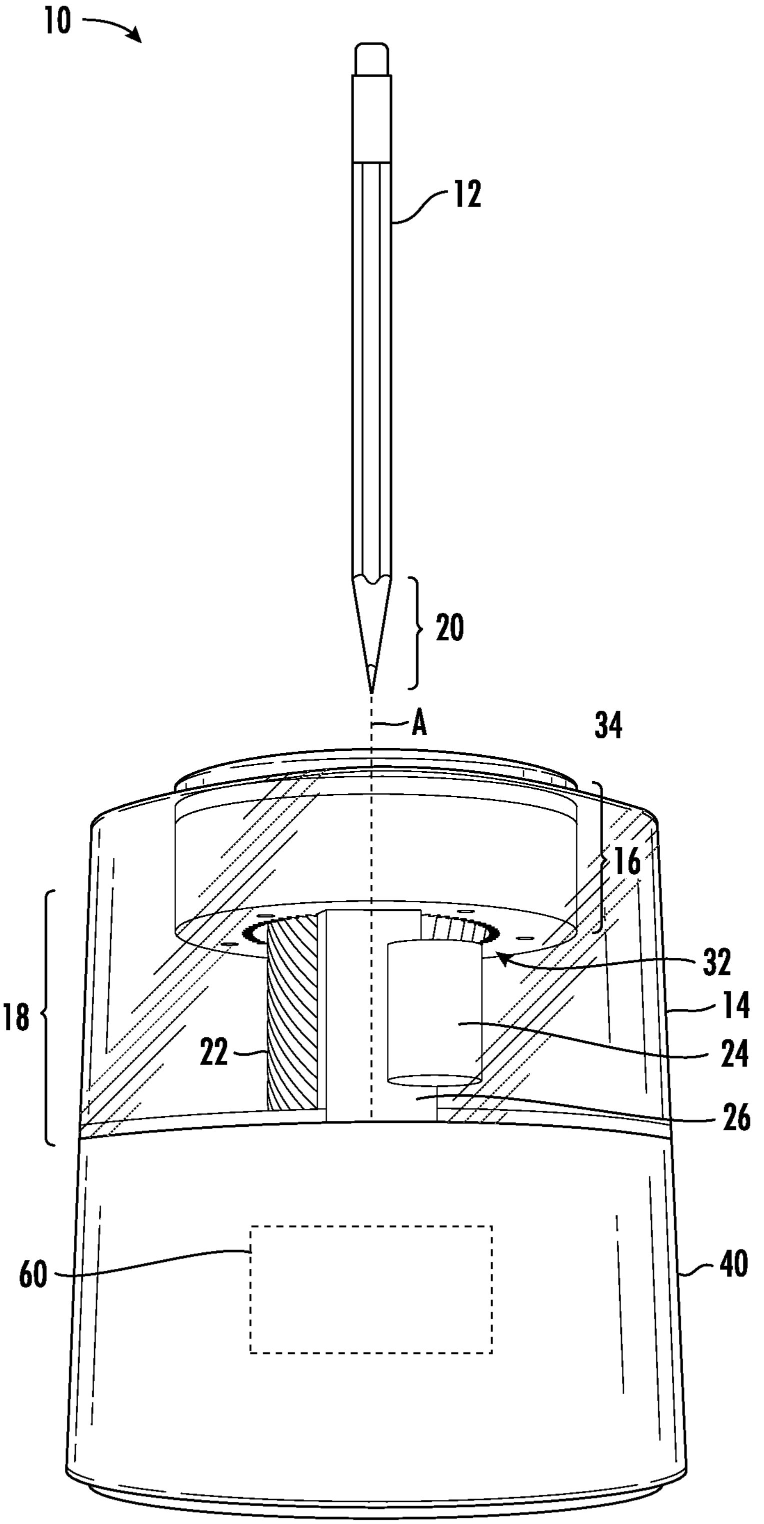
FIG. 1A is a conceptual perspective view of a sharpener for sharpening a writing instrument, the sharpener including a receptacle, an entry assembly, and a cutter assembly.

It is to be understood that the invention is not limited in its application to the details of construction and the arrangement of components illustrated in the drawings or set forth in the following description.

DETAILED DESCRIPTION

The present disclosure describes sharpeners for writing instruments. The writing instruments may include graphite pencils, crayons, color pencils, or any instrument that has a generally elongated writing core surrounded by a support matrix, with the writing core and matrix being shavable or abradable to expose a writing tip extending from the writing core.

Sharpeners may include a static or moving cutter assembly that abrades or shaves an end of a writing instrument to sharpen the end, for example, to define a writing tip. The cutter assembly may be driven manually or electrically. Easy and safe access to the cutter assembly to remove broken instrument cores or for general cleaning has been a typical shortcoming of pencil sharpeners. A full and unobstructed 360° access to the cutter assembly may allow the user to dislodge any obstruction and to completely clear any debris. Eliminating obstructions and debris may promote safer, smoother, and a more efficient sharpening operation, for example, by reducing the number of sharpening cycles needed or by avoiding the need for repeated cleaning.

Some sharpeners may include cutter assemblies that are removable reinstallable on the sharpener, to provide access for cleaning. However, these removeable cutter assemblies may increase the complexity of manufacturing, complexity of operation, or result in increased costs. Additional steps of disassembly and reassembly of sharpener components beyond its normal operation may be required. A user may be familiar with such procedures, which may increase the likelihood of product damage and user frustration, or may affect safe operation. Furthermore, even if such procedures are successfully performed, adequate access for sufficient cleaning of the cutter assembly or other components of the sharpener may not be available.

For example, some sharpeners attempt to provide access to the cutter assembly by orienting the sharpener to allow vertical entry of a writing instrument. In these sharpeners, the shavings bin surrounds the cutter assembly such that the bin's removal for shaving disposal provides access to the cutter assembly. This approach, however, may still not provide full access to the cutter because, like the removeable cutter assemblies, the surrounding structure supporting the cutter and maintaining its connection to the ring gear may prevent full access.

For example, such sharpeners include a cage surrounding the sharpener assembly and supporting the sharpener components. Even if multiple windows are provided in the sharpener, the remaining cage prevents adequate access.

In embodiments, sharpeners according to the disclosure may be used to sharpen writing instruments and securely retain shavings in a receptacle, while allowing access to the cutter assembly for cleaning or maintenance with relatively easy disassembly. For example, sharpeners according to the disclosure may allow relatively easy removal and reassembly of a receptacle relative to a cutter assembly, and the cutter assembly may be adequately exposed for cleaning, for example, with over 180°, over 270°, or substantially 360° access about the cutter assembly.

In embodiments, sharpeners according to the disclosure may retain the cutter assembly in engagement with an entry assembly coupled to a receptacle, such that no further cage or supporting structure apart from the receptacle or cutter assembly is required to house and retain the cutter assembly in sharpening engagement with a writing instrument. In some embodiments, the entry assembly includes a ring gear adjacent an instrument opening. Thus, the ring gear may be coupled to the receptacle, and separable from the cutter assembly upon removal of the receptacle. In some such embodiments, the remaining cutter assembly may be solely supported by a base or by a cutter platform, and may be easily and safely inspected and cleaned with sufficient, for example, over 180°, over 270°, or substantially 360° access about the cutter assembly.

The terms "sharpener" and "sharpener assembly" are interchangeable, and the sharpener may include multiple components assembled together, with one or more component being removable from the sharpener or sharpener assembly.

In embodiments, a sharpener for a writing instrument includes a receptacle, an entry assembly, and a cutter assembly. The entry assembly is coupled to the receptacle and defines an instrument opening. The entry assembly is configured to receive an end of the writing instrument through the instrument opening along an entry axis. The cutter assembly is configured to revolve about the entry axis in engagement with the entry assembly to sharpen the end of the writing instrument. The cutter assembly is removably engageable with the entry assembly at least by relative translation between the cutter assembly and the receptacle along the entry axis. In some embodiments, the sharpener further includes a base removably secured to the receptacle. In some such embodiments, the receptacle is separable from the base to allow cleaning of the sharpener.

In embodiments, the sharpener further includes a cutter platform opposing the entry assembly. In some such embodiments, the cutter assembly extends between the cutter platform and the entry assembly. In some embodiments, the receptacle may be removably securable to the cutter platform to form a sub-assembly, and the sub-assembly may be removably securable to a base of the sharpener. For example, the sub-assembly may retain shavings upon sharpening of a writing instrument, and for cleaning, the sub-assembly may initially be separated from the base, followed by a further separation of the receptacle from the cutter platform. In some such embodiments, such a configuration may allow moving only the sub-assembly towards or adjacent a waste receptacle for disposing shavings or debris, while leaving the base in place. In some such embodiments, shavings or debris are transportable to a disposal site in an enclosed container (receptacle with cutter platform), promoting cleanliness and sanitation of the environment of the sharpener.

In addition to one or more advantages described elsewhere in the present disclosure, sharpeners according to embodiments of the present disclosure may provide access to an interior of the sharpener, or to a cutter assembly or another component of the sharpener, without requiring disassembly in addition to removal of the receptacle from the sharpener. Thus, solely the removal of the receptacle (for example, from a base, or from a cutter platform) may provide adequate access to the cutter assembly without requiring removal of further components adjacent the cutter assembly, for cleaning or maintenance. Likewise, reassembly may only require replacement of the receptacle (for example, onto the base, or onto the cutter platform), without requiring replacement of additional components adjacent the cutter assembly. Sharpeners according to the present disclosure may also be relatively easier to manufacture, may require fewer components, or be relatively cheaper than other sharpeners.

Moreover, because the entry assembly or a ring gear may be removable with the receptacle, the entry assembly or ring gear may be easily separable from the cutter assembly. Such separation may provide for further cleaning and maintenance of one or more gears or components of the cutter assembly or entry assembly.

Some writing instruments may be susceptible to breakage, for example, of a writing core or of a support matrix surrounding the writing core. For example, colored pencils may have relatively softer cores than graphite pencils, and graphite pencils of a softer grade may have relatively softer cores than graphite pencils of a harder grade. A portion of such instruments may break during sharpening, leaving pieces of the instrument in addition to shavings. The pieces may be stuck between or within components of the sharpener, for example, in or adjacent the cutter assembly. In embodiments, sharpeners according to the present disclosure may promote relatively easy removal of broken pieces or instrument cores.

Figure 1B:
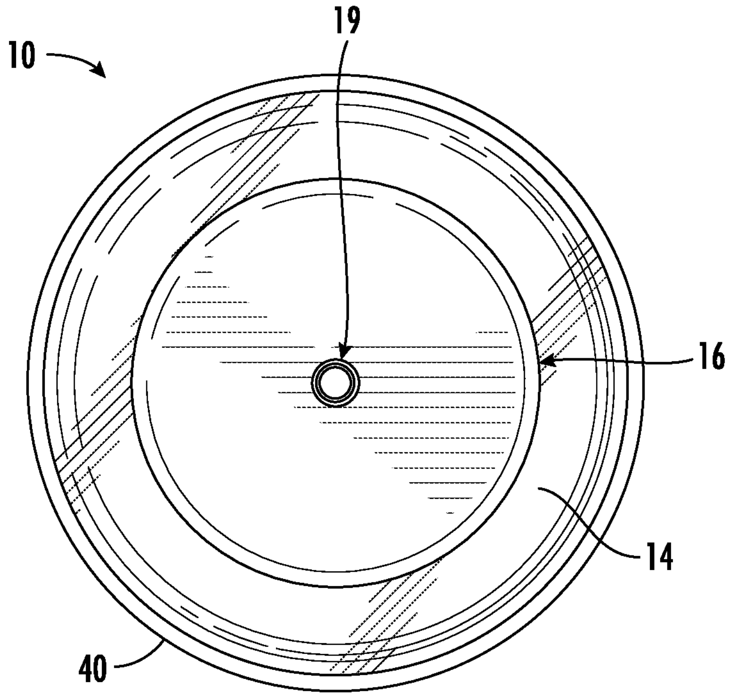
FIG. 1B is a top view of the sharpener of FIG. 1A.
Figure 1C:
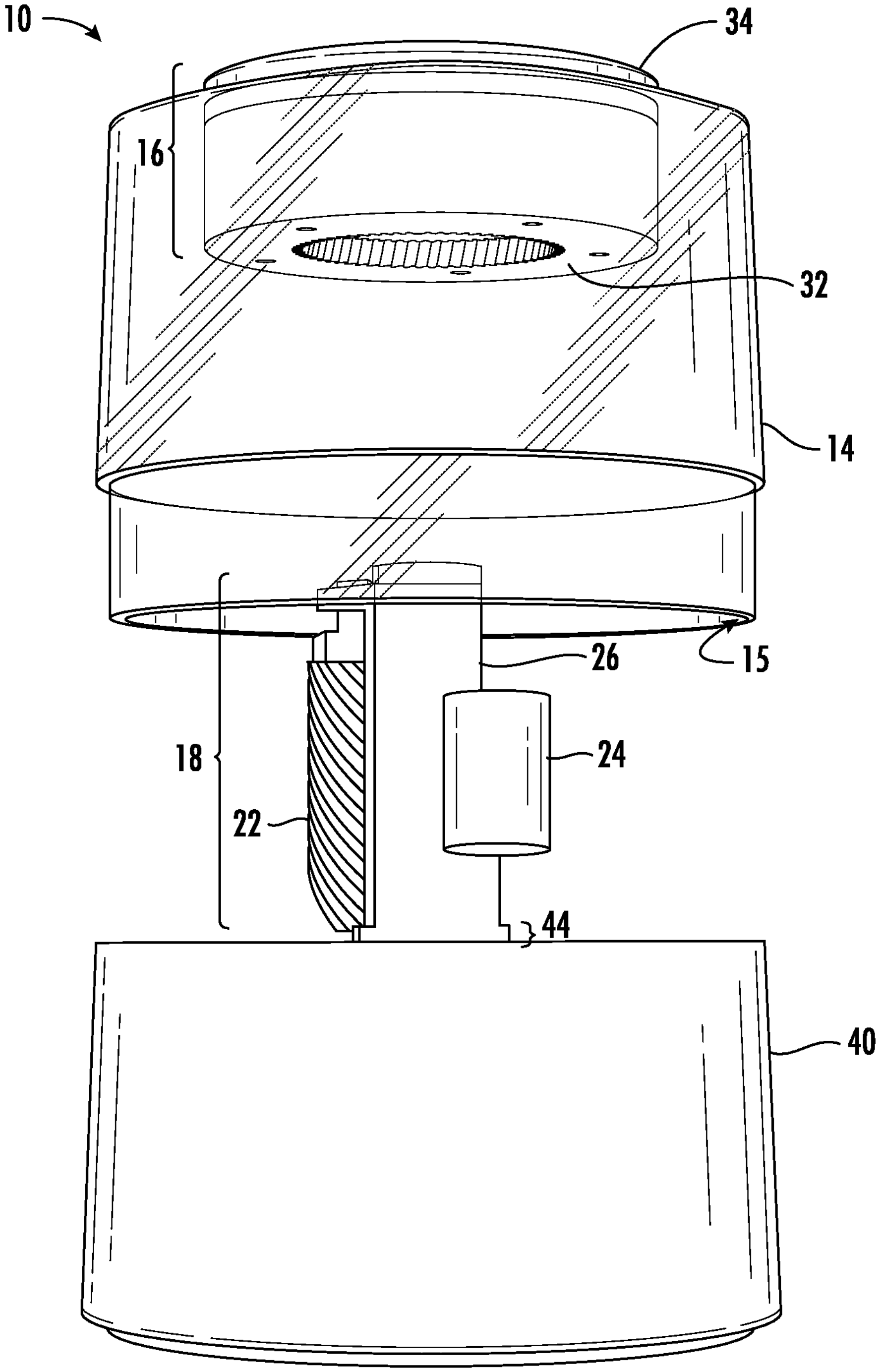
FIG. 1C is an exploded view of the sharpener of FIG. 1A.

FIG. 1A is a conceptual perspective view of a sharpener 10 for sharpening a writing instrument 12, sharpener 10 including a receptacle 14, an entry assembly 16, and a cutter assembly 18. FIG. 1B is a top view of sharpener 10 of FIG. 1A. FIG. 1C is an exploded view of sharpener 10 of FIG. 1A.

Receptacle 14 may include any suitable material, for example, a polymeric material, a glass, a ceramic, a wood, a metal or alloy, or a composite. In embodiments, receptacle 14 is formed of a plastic material. In some embodiments, receptacle 14 includes a transparent or translucent region or window, or the entirety of receptacle 14 may be transparent or translucent. Receptacle 14 may have any suitable shape, and may define any suitable cross-sectional perimeter, for example, circular, ellipsoidal, polygonal, square, rectangle, or a compound curvilear perimeter. In the embodiment shown in FIG. 1A, receptacle 14 is substantially cylindrical, and defines a circular cross-section. Receptacle 14 may be sufficiently rigid to substantially retain its shape. However, in some embodiments, receptacle 14 may be reversibly or irreversibly deformable, for example, in response to pressure greater than a threshold. In some embodiments, receptacle 14 is a unitary or integral structure. In other embodiments, receptacle 14 may include two or more removable pieces, for example, removably securable to each other or to another component of sharpener 10.

Entry assembly 16 is coupled to receptacle 14. For example, entry assembly 16 may be coupled to receptacle 14 by an overmold, interference fit, friction fit, adhesive, weld, or fastener, or combinations thereof. Entry assembly 16 defines instrument opening 19, for example, as shown in FIG. 1B. While entry assembly 16 may generally be disposed about a central axis of sharpener 10, with instrument opening 19 generally at a geometric center of entry assembly 16 as shown in FIG. 1B, in other embodiments, instrument opening 19 may be offset from a geometric center of entry assembly 16 or of sharpener 10. Entry assembly 16 may also be offset from a geometric center of sharpener 10. While entry assembly 16 is coupled to an upper surface of sharpener 10 relative to gravity in the embodiments shown in FIGS. 1A and 1B, in other embodiments, entry assembly 16 may be coupled to a bottom surface of sharpener 10, or to an inclined or side surface of receptacle 14 or sharpener 10. Entry assembly 16 is configured to receive an end 20 of writing instrument 12 through instrument opening 19 along an entry axis A. As shown in FIG. 1A, in some examples, entry axis A may be generally vertical, for example, opposing a direction of gravity. Thus, sharpener 10 may have a generally vertical configuration for sharpening. However, in other embodiments, sharpener 10 may have an inclined or horizontal configuration. For example, entry axis A may be transverse, inclined, or at a right angle relative to gravity. Entry assembly 16 may include a metal or alloy, a polymer, or any other suitable material.

Sharpener 10 includes cutter assembly 18 configured to revolve about entry axis A in engagement with entry assembly 16 to sharpen end 20 of writing instrument 12. Cutter assembly 18 is removably engageable with entry assembly 16 at least by relative translation between cutter assembly 18 and receptacle 14 along entry axis A. For example, upon relative translation between receptacle 14 relative to cutter assembly 18, entry assembly 16 also translates relative to cutter assembly with receptacle 14.

In embodiments, cutter assembly 18 includes a cutter gear 22 configured to revolve about entry axis A in engagement with entry assembly 16 and in contact with end 20 of writing instrument 12. In some embodiments, cutter assembly 18 includes a counterweight 24 opposing cutter gear 22 and configured to rotate about entry axis A. One or both of cutter gear 22 or counterweight 24 may include a metal or alloy, or any suitable rigid material suitable for shaving, abrading, or otherwise sharpening writing instrument 12. Counterweight 24 may provide balance to the cutter gear 22 as it revolves about the entry axis, which may provide stability to sharpener 10 during operating, for example, by dampening oscillations or vibrations. Counterweight 24 may be generally opposed to cutter gear 22 during the revolution of cutter gear 22.

In some embodiments, cutter assembly 18 includes a column 26 extending in a direction along the entry axis. In some such embodiments, column 26 defines an instrument channel 28 along the entry axis configured to receive end 20 of writing instrument 12.

In some embodiments, an end of column 26 adjacent entry assembly 16 defines a tab 30 extending transverse to entry axis A. Tab 30 securely retains an end 23 of cutter gear 22, for example, in an opening defined by tab 30. Tab 30 may retain cutter gear 22 at a predetermined incline or angle relative to entry axis A or column 26, such that cutter gear 22 provides a predetermined angled surface, for example, a conical surface, to end 20 of writing instrument 12 upon sharpening.

In some embodiments, entry assembly 16 includes a ring gear 32. Ring gear 32 may be integrally formed by entry assembly 16, or may be separately formed and secured within or to entry assembly 16. In some examples, entry assembly includes a cylindrical portion, with an end of the cylindrical portion defining ring gear 32. Ring gear 32 may include any material described with reference to entry assembly 16, for example, a metal or alloy. Ring gear 32 may be made from the same or different material as entry assembly 16.

In some embodiments, entry assembly 16 includes an entry plate 34 transverse to entry axis A and defining instrument opening 19. In some embodiments, entry plate 34 is spaced from ring gear 32, and both ring gear 32 and entry plate 34 are separately coupled to receptacle 14.

In other embodiments, entry plate 34 is coupled to ring gear 32. For example, entry plate 34 may be coupled to ring gear 32 by an overmold, interference fit, friction fit, adhesive, weld, or fastener, or combinations thereof. In some embodiments, ring gear 32 and entry plate 34 may be integrally formed as opposing portions of integral entry assembly 16, and receptacle 14 may be secured to entry assembly 16 between the opposing portions. For example, entry assembly 16 may define a channel, groove, or mating surface between the opposing portions or otherwise between ring gear 32 and entry plate 34, and receptacle 14 may be received about the entry assembly 16 at the channel, groove, or mating surface.

In some embodiments, sharpener 10 further includes a base 40 removably coupled to receptacle 14 and opposing entry assembly 16, where cutter assembly 18 is between base 40 and entry assembly 16. In some such embodiments, base 40 is removably couplable to receptacle 14 at least by relative translation between base 40 and receptacle 14 along entry axis A. Base 40 may include a housing, and the housing may include any suitable material, such as a polymeric material, a glass, a ceramic, a wood, a metal or alloy, or a composite. Base 40 may have any suitable shape, for example, a shape conforming to or complementary to that of receptacle 14, such that receptacle 14 can be removably secured to base 40. Base 40 may define a channel, recess, groove, or mating structure to receive a portion of receptacle 14. Likewise, an end of receptacle 14 may define a channel, recess, groove, or mating structure to receive a portion of base 40.

In some embodiments, base 40 includes a cutter platform 42. Cutter platform 42 may be fixedly or removably secured to base 40. Cutter platform 42 may be formed of any suitable material, for example, a material described with reference to base 40. In some embodiments, base 40 or cutter platform 42 defines a raised boss 44. An end of cutter assembly 18 or cutter gear 22 opposing the entry plate 34 may be held or retained against a surface of base 40, cutter platform 42, or raised boss 44. Raised boss 44 may be cylindrical, conical, rectanguloid, truncated pyramidal, or have any other suitable shape. Raised boss 44 may define a pit or opening to receive the end of cutter assembly 18 opposing entry plate 34.

In some embodiments, sharpener 10 includes a drive assembly 60 configured to drive cutter assembly 18 to revolve about entry axis A for sharpening end 20 of writing instrument 12. Drive assembly 60 may include an electrical motor or a manual mechanism, for example, driven by manually rotating a handle, coupled to cutter assembly 18. Sharpener 10 may include a removable or rechargeable power source, for example, one or more cells or batteries, for powering drive assembly. In some embodiments, drive assembly 60 may be powered by an external source, for example, from an outlet or a power supply. Thus, end 20 of writing instrument 12 may be introduced through instrument opening 19 into engagement with cutter gear 22, and cutter gear 22 may revolved about entry axis A, for example, driven by drive assembly 60 to sharpen end 20.

Figure 1D:
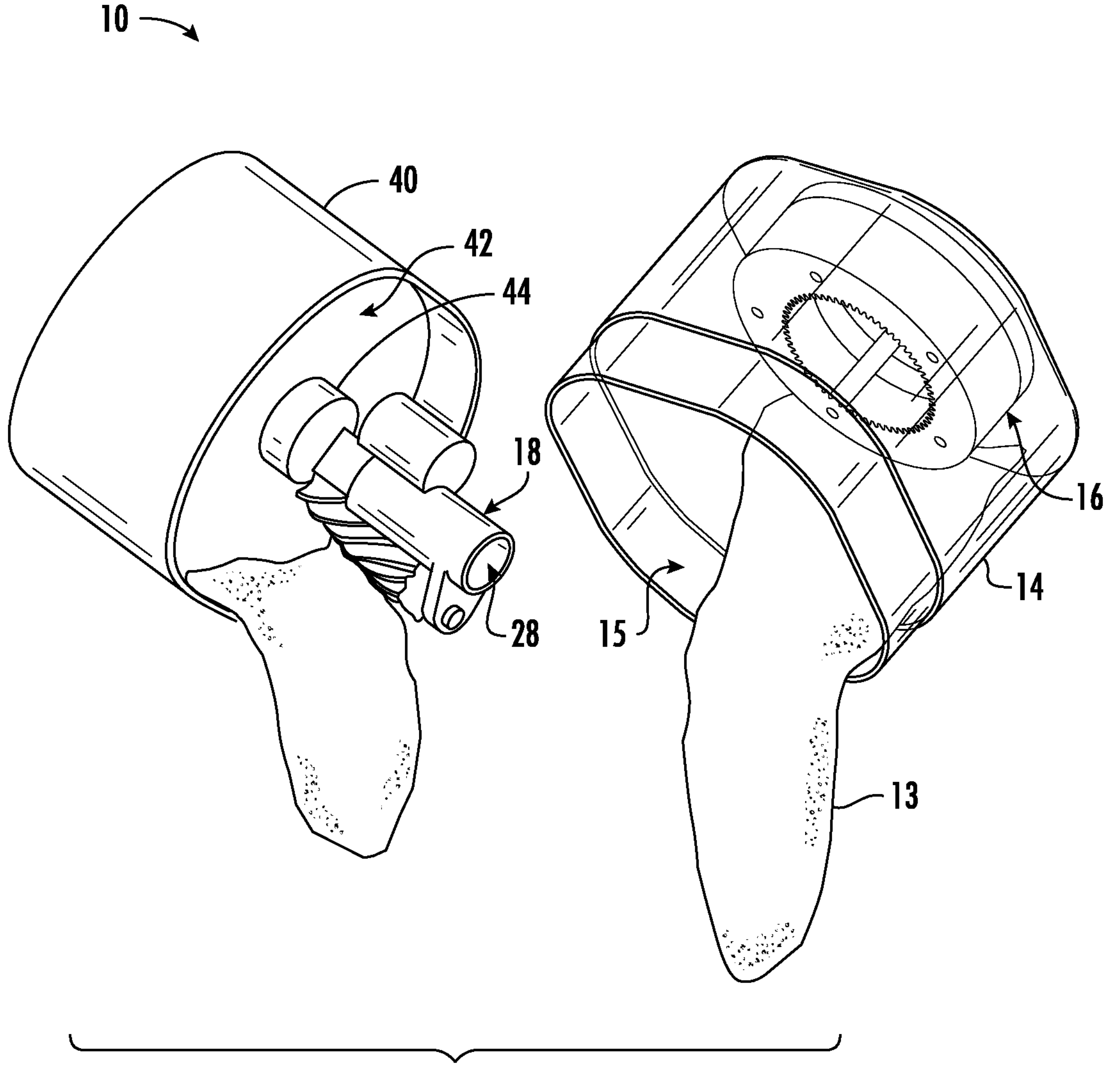
FIG. 1D is a perspective view of the sharpener of FIG. 1A showing separation of the receptacle to allow cleaning.

FIG. 1D is a perspective view of the sharpener of FIG. 1A showing separation of receptacle 14 to allow cleaning. The sharpening may generate shavings, broken pieces, or debris 13. The shavings, pieces, or debris 13 may be retained within an interior volume defined between receptacle 14 and base 40. For example, an interior surface 15 of receptacle 14 may partially define the interior volume. After sharpening, receptacle 14 may be separated from sharpener 10, for example, from base 40, by an initial translational motion followed by a further separation in any arbitrary direction, as shown in FIGS. 1C and 1D, to release shavings, pieces, or debris 13 from receptacle 14 or base 40 for disposal. As shown in FIGS. 1C and 1D, cutter assembly 18 is substantially exposed for cleaning or maintenance upon removal of receptacle 14.

In some embodiments, one or both of cutter gear 22 and ring gear 32 includes a metal or an alloy. The metal or alloy may be same or different. In some embodiments, one or more of receptacle 14, column 26, cutter platform 42, and base 40 include a plastic. The plastic may be same or different.

Thus, embodiments of sharpener 10 have been described with reference to FIGS. 1A to 1D. Further embodiments of sharpeners are described with reference to FIGS. 2A to 2E (sharpener 100) and FIGS. 3A and 3B (assembly 200). Reference numerals defined by the same last two digits refer to the same or similar elements with the same or similar functions.

Figure 2A:
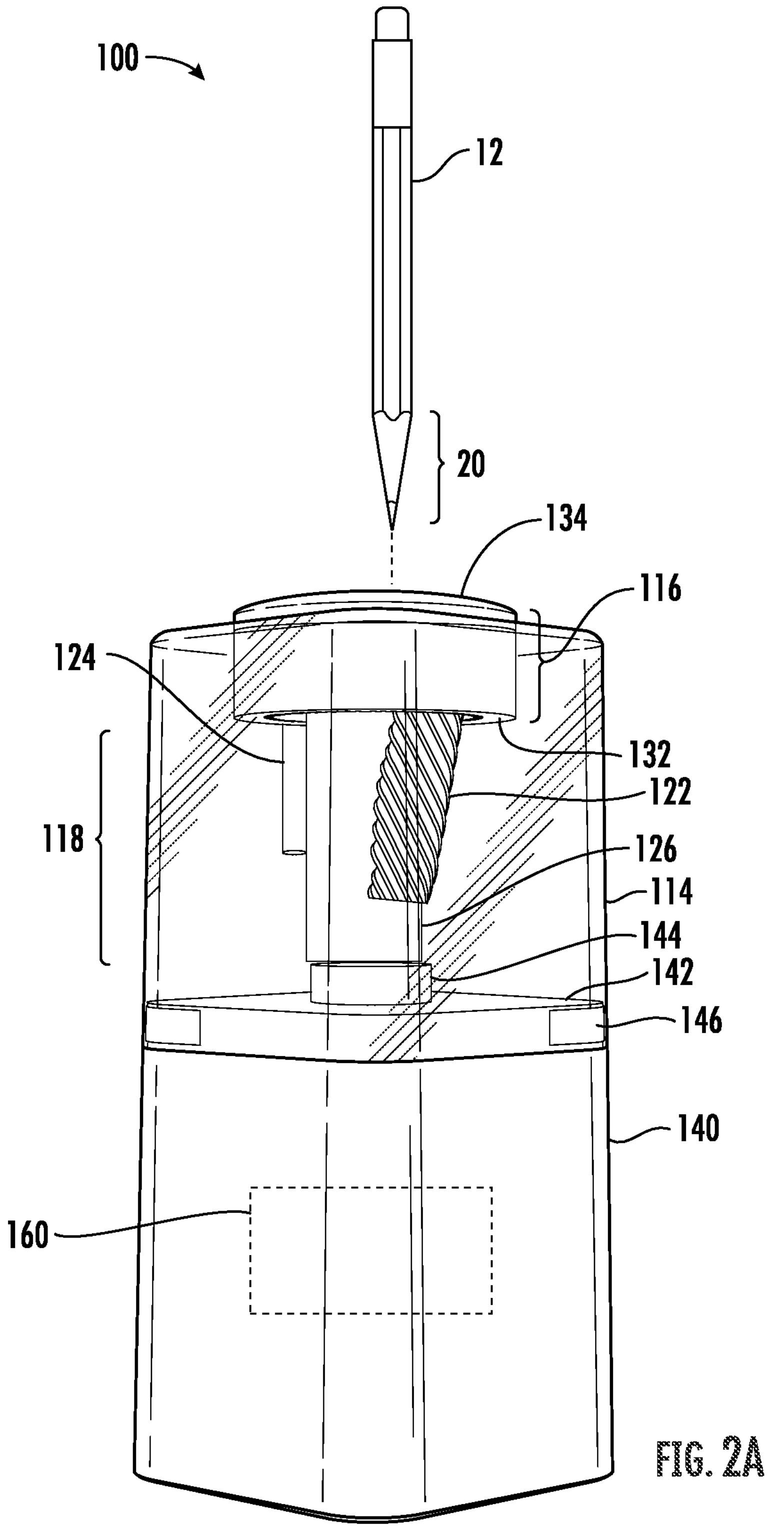
FIG. 2A is a conceptual perspective view of a sharpener for sharpening a writing instrument, the sharpener including a receptacle, an entry assembly, a cutter assembly, and a cutter platform.
Figure 2B:
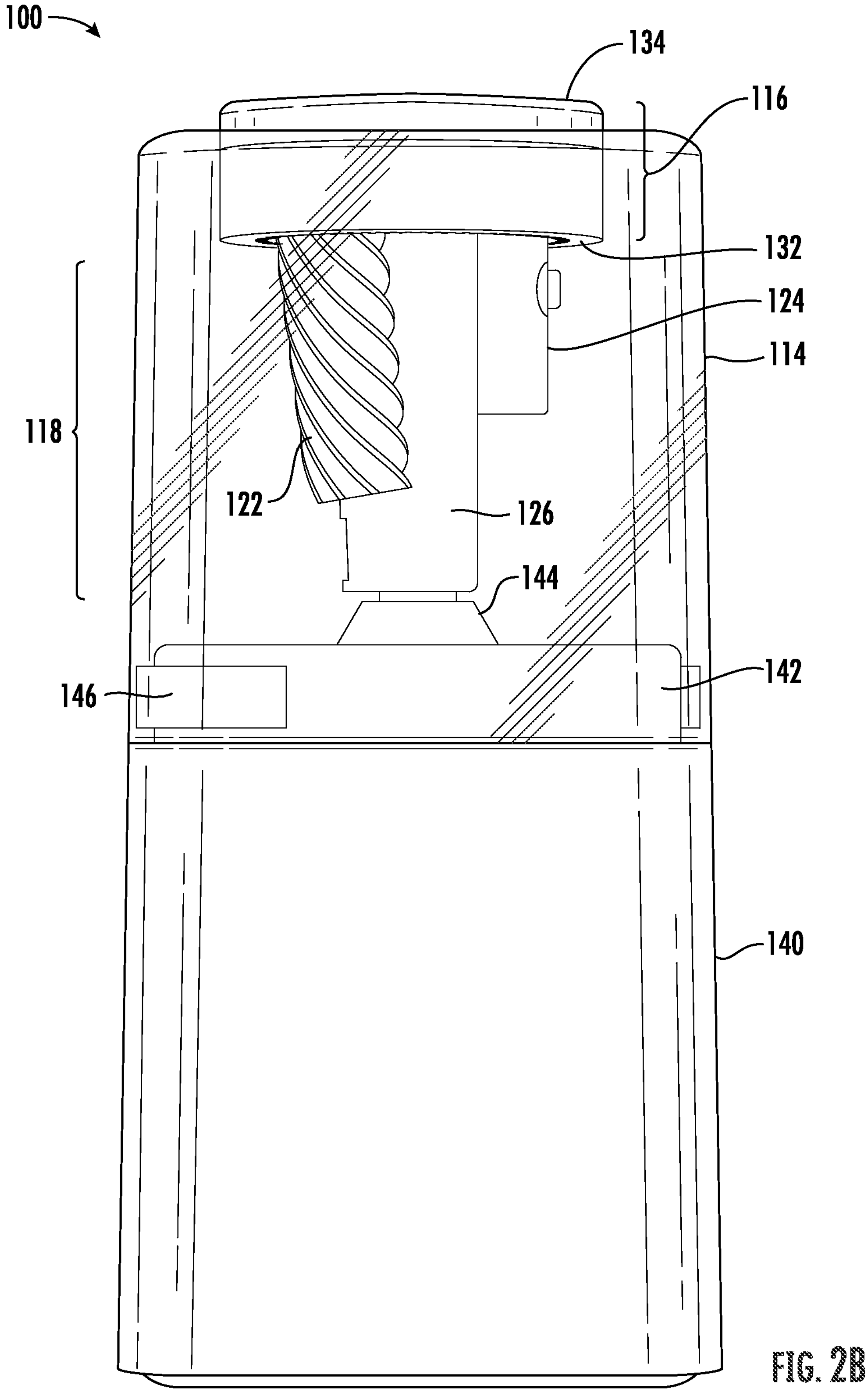
FIG. 2B is a front view of the sharpener of FIG. 2A.
Figure 2C:
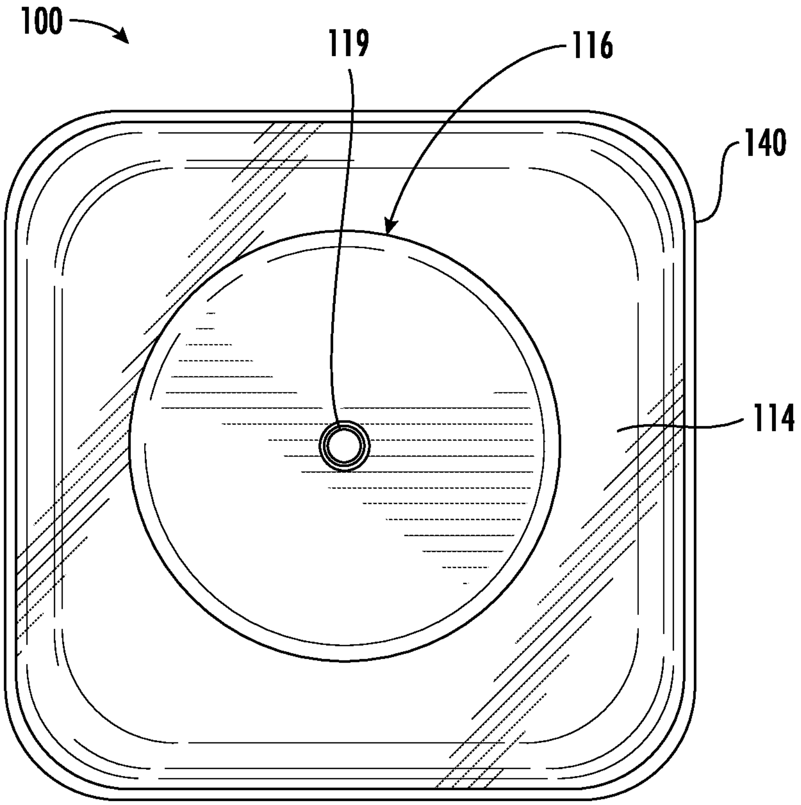
FIG. 2C is a top view of the sharpener of FIG. 2A.
Figure 2D:
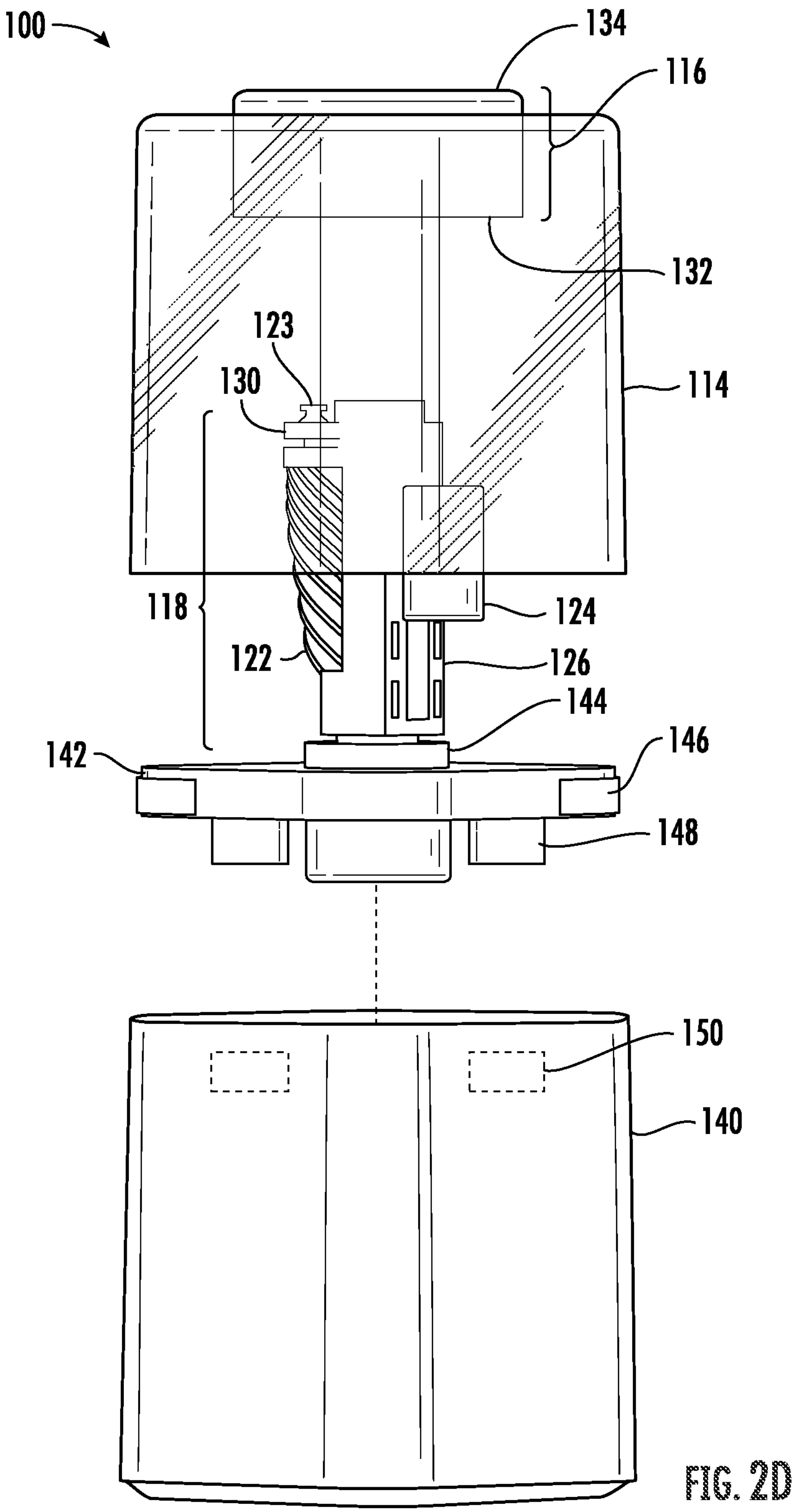
FIG. 2D is an exploded view of the sharpener of FIG. 2A.

FIG. 2A is a conceptual perspective view of a sharpener 100 for sharpening a writing instrument 12, sharpener 100 including a receptacle 114, an entry assembly 116, a cutter assembly 118, and a cutter platform 142. FIG. 2B is a front view of sharpener 100 of FIG. 2A. FIG. 2C is a top view of sharpener 100 of FIG. 2A. FIG. 2D is an exploded view of sharpener 100 of FIG. 2A.

Receptacle 114, entry assembly 116, and cutter assembly 118 may be similar in construction and configuration to receptacle 14, entry assembly 16, and cutter assembly 18 described with reference to FIGS. 1A to 1D. In the embodiment shown in FIG. 2A, receptacle 114 has a rounded square cross-section, and generally defines a rounded rectangle parallelepiped shape. Entry assembly 116 is coupled to receptacle 114 and defines an instrument opening 119, entry assembly 116 being configured to receive end 20 of writing instrument 12 through the instrument opening 119 along an entry axis A. Cutter assembly 118 is configured to revolve about entry axis A in engagement with entry assembly 116 to sharpen end 20 of writing instrument 12. Cutter assembly 118 is removably engageable with entry assembly 116 at least by relative translation between cutter assembly 118 and receptacle 114 along entry axis A. Cutter assembly 118 comprises a cutter gear 122 configured to revolve about entry axis A in engagement with entry assembly 116 and in contact with end 20 of writing instrument 12.

In some embodiments, cutter assembly 118 includes a counterweight 124 opposing cutter gear 122 and configured to rotate about entry axis A. In some embodiments, cutter assembly 118 includes a column 126 extending in a direction along entry axis A, where column 126 defines an instrument channel 128 along entry axis A configured to receive end 20 of writing instrument 12. In some embodiments, an end of column 126 adjacent entry assembly 116 defines a tab 130 extending transverse to entry axis A, where tab 130 retains an end 123 of cutter gear 122. Instrument opening 119, cutter gear 122, counterweight 124, column 126, instrument channel 128, and tab 130 are generally the same as or similar to instrument opening 19, cutter gear 22, counterweight 24, column 26, instrument channel 28, and tab 30 described with reference to FIGS. 1A to 1D.

In some embodiments, entry assembly 116 includes a ring gear 132. In some embodiments, entry assembly 116 includes an entry plate 134 transverse to entry axis A and defining instrument opening 119. In some embodiments, entry plate 134 is coupled to ring gear 132. Ring gear 132 and entry plate 134 may be generally the same as or similar to ring gear 32 and entry plate 34 of entry assembly 16 described with reference to FIGS. 1A to 1D.

In some embodiments, sharpener 100 includes a base 140 removably coupled to receptacle 114 and opposing entry assembly 116, wherein cutter assembly 118 is between base 140 and entry assembly 116. Base 140 may be generally similar to base 40 described with reference to FIGS. 1A to 1D. Base 140 may be removably couplable to receptacle 114 at least by relative translation between base 140 and receptacle 114 along the entry axis. In the embodiment shown in FIG. 2A, base 140 has a rounded rectangular cross-section.

Sharpener 100 further includes a cutter platform 142 transverse to entry axis A and opposing entry assembly 116. Cutter assembly 118 extends between cutter platform 142 and entry assembly 116. Cutter platform 142 may include a metal or alloy, a plastic, a composite, or any other suitable substantially rigid or support material. Cutter platform 142 is removably secured to receptacle 114 and to base 140. For example, one surface or portion of cutter platform 142 faces base 140, and cutter platform 142 is secured to base 140 at that surface or portion. Likewise, an opposing surface or portion of cutter platform 142 faces receptacle 114, and cutter platform 142 is secured to receptacle 114 at that opposing surface or portion.

Figure 2E:
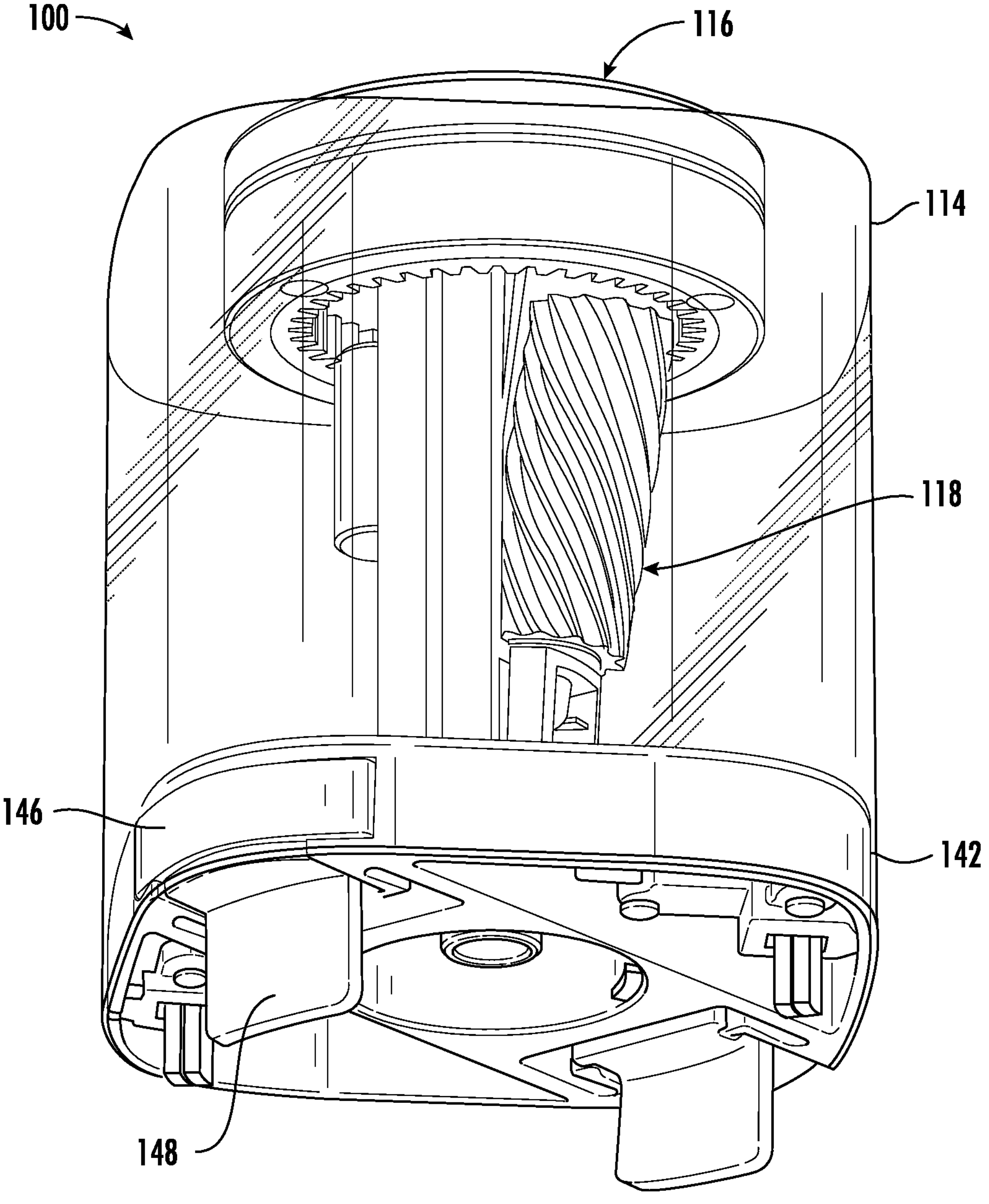
FIG. 2E is a partial exploded view of the sharpener of FIG. 2A showing the receptacle, the entry assembly, the cutter assembly, and the cutter platform separated from the base.

FIG. 2E is a partial exploded view of the sharpener of FIG. 2A showing receptacle 114, entry assembly 116, cutter assembly 118, and cutter platform 142 separated from base 140. In some embodiments, receptacle 114 remains secured to cutter platform 142 upon removal of cutter platform 142 from sharpener 100 (or from base 140 of sharpener 100), and receptacle 114 and cutter platform 142 together retain shavings, pieces, or debris within an interior volume defined therebetween. A sub-assembly including receptacle 114 secured to cutter platform 142 can thus be removed from sharpener 100, and taken to a disposal site. At or adjacent the disposal site, receptacle 114 is separated from cutter platform 142 to release and dispose shavings, pieces, or debris. For example, cutter platform 142 is removably couplable to receptacle 114 at least by relative translation between cutter platform 142 and receptacle 114 along entry axis A.

Upon separation of receptacle 114 from cutter platform 142, cutter assembly 118 remains secured to cutter platform 142, with cutter assembly 118 exposed for cleaning or maintenance. In some embodiments, cutter platform 142 defines a raised boss 144 facing cutter assembly 118 and configured to retain an end of cutter assembly 118 opposing entry assembly 116. Raised boss 144 is configured to allow cutter assembly 118 to rotate in contact with cutter platform 142. In some embodiments, raised boss 144 is configured to retain an end of cutter assembly 118 upon separation of receptacle 114 from cutter platform 142, so that cutter assembly remains secured to cutter platform 142. Raised boss may be substantially cylindrical as shown in FIG. 2A, truncated conical as shown in FIG. 2B, or may have any other suitable shape or configuration.

In some embodiments, cutter platform 142 includes at least one pad 146 biased to remain in contact with an interior surface 115 of receptacle 114 to secure cutter platform 142 to receptacle 114. At least one pad 146 may be disposed at any suitable location or locations along a periphery of cutter platform 142 and facing interior surface 115 of receptacle 114. Cutter platform 142 may include at least one biasing element, for example, a spring, for biasing at least one pad 146 outward toward interior surface 115. In some embodiments, cutter platform 142 does not include a separate biasing element, and at least one pad 146 may be biased by a molded construction. For example, at least one pad 146 may be formed molded to protrude or extend out from cutter platform 142, and may be pushed inward before or during coupling receptacle 114 to cutter platform 142 to generate the outward bias. At least one pad 146 may include one or more than one pad, and may include an odd or even number of pads. The pads may be evenly or unevenly distributed about cutter platform 142.

In some embodiments, sharpener 100 includes two pads 146 diagonally opposed at corners of cutter platform 142, as shown in in FIGS. 2A and 2E. At least one pad 146 may include natural or synthetic foam, rubber, elastic, resilient, solid, hollow, porous, or deformable material. Different pads of at least one pad 146 may include the same or different material, or combinations of materials.

In some embodiments, cutter platform 142 includes at least one press tab 148 coupled to at least one pad 146. At least one press tab 148 may be integrally formed with cutter platform 142 or at least one pad 146. In other embodiments, at least one press tab is not continuous with at least one pad 146. At least one press tab 148 may include any material described with reference to cutter platform 142 or at least one pad 146. At least one press tab 148 may extend away from cutter platform 142 in a direction along entry axis A and opposite cutter assembly 118. At least one press tab 148 is configured to remove at least one pad 146 from the contact with interior surface 115 of receptacle 114. For example, a user may press or squeeze at least one press tab 148 inward to cause at least one pad 146 to also be moved inward, and therefore, released from contact with interior surface 115. In some embodiments, sharpener 100 includes two pads 146 and two tabs 148 diagonally opposed at corners of cutter platform 142, as shown in in FIGS. 2A and 2E. Such a configuration may allow simultaneous squeezing or pressing of both tabs 148 to release both pads 146 from interior surface 115 for a relatively easy release of receptacle 114 from cutter platform 142.

In some embodiments, base 140 defines at least one slot 150 facing cutter platform 142, wherein at least one slot 150 is configured to receive at least one press tab 148. In some embodiments, at least one press tab 148 may be retained securely in at least one slot 150 by one or more of an interference fit, a friction fit, clips, fasteners, pads, or biasing elements for removably coupling cutter platform 142 to base 140 at least by relative twisting or relative translation between cutter platform 142 and base 140. For example, cutter platform 142 (and receptacle 114 if secured to cutter platform 142) may be removed from base 140 by relative rotation to rotatably release at least one press tab 148 from at least one slot 150, followed by relative translation to separate and space apart cutter platform 142 from base 140. In some embodiments, relative rotation may not be required, and relative translation between cutter platform 142 from base 140 may be sufficient to separate cutter platform 142 from base 140. Sharpener 100 may include a drive assembly 160 (generally the same as to similar to drive assembly 60 described with reference to FIGS. 1A to 1D) to drive cutter assembly 118 to revolve about entry axis A.

Figure 3A:
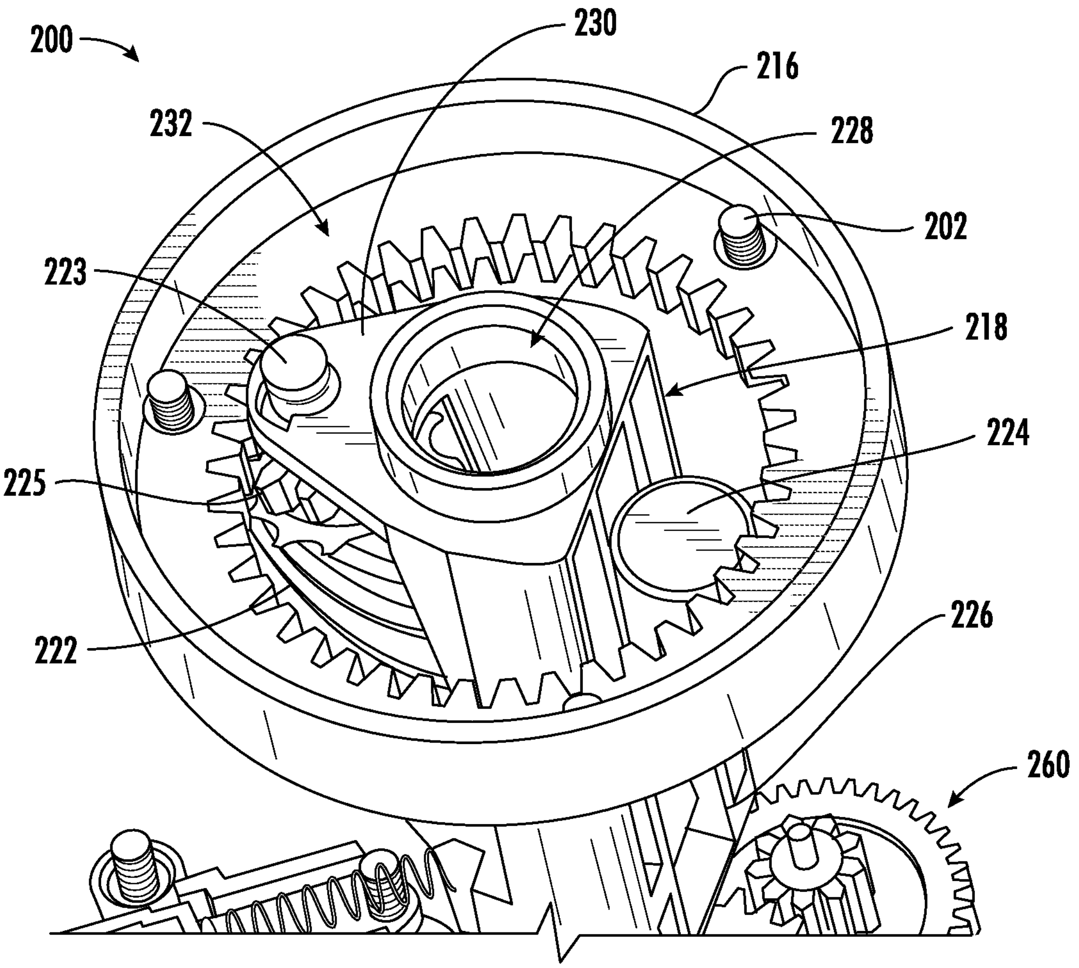
FIG. 3A is a partial perspective view of an assembly including a ring gear and a cutter assembly.
Figure 3B:
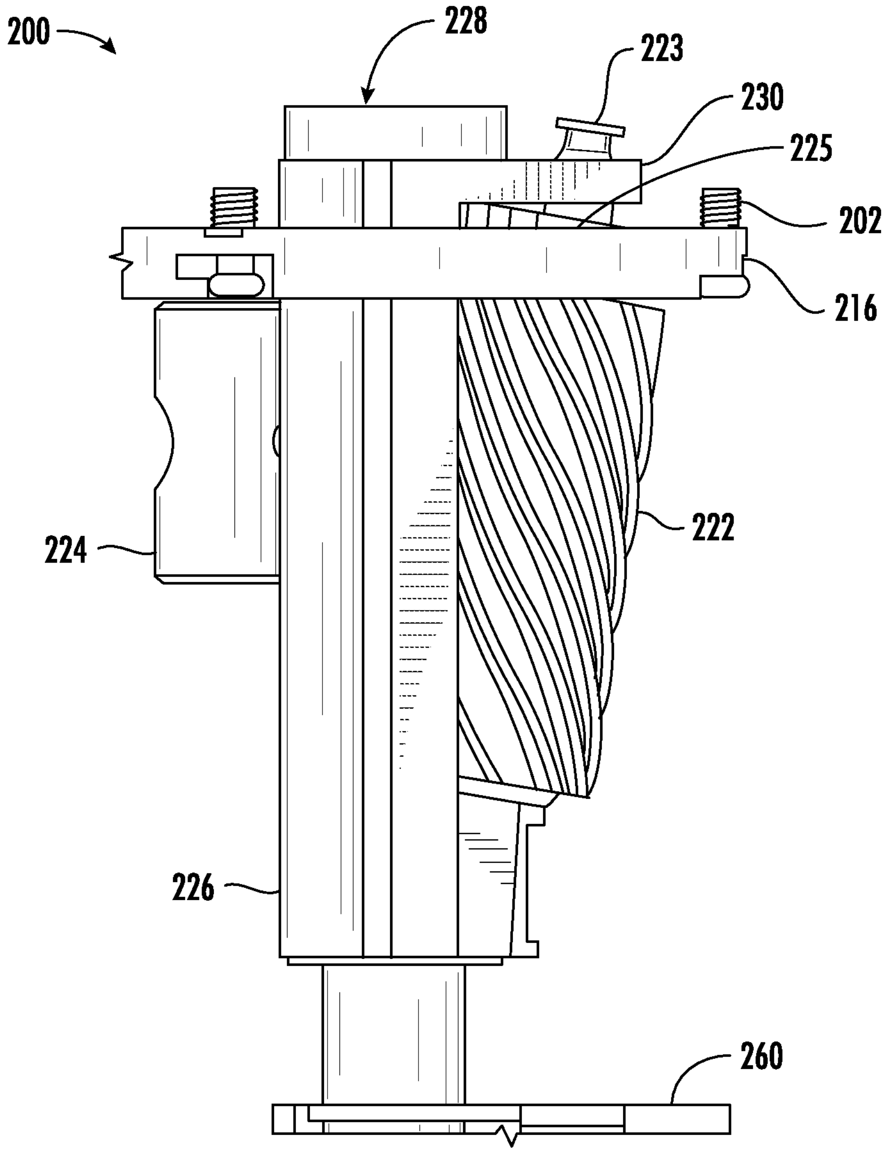
FIG. 3B is a partial side view of the assembly of FIG. 3A.

FIG. 3A is a partial perspective view of an assembly 200 including a ring gear 232 and a cutter assembly 218. FIG. 3B is a partial side view of assembly 200 of FIG. 3A. In some embodiments, the structure, configuration, or operation of cutter assembly 18 or cutter assembly 118 may be similar to that described with reference to cutter assembly 218, and that of ring gear 32 or 132 (or entry assembly 16 or 116) may be similar to that described with reference to ring gear 232 (or entry assembly 216).

Assembly 200 includes cutter assembly 218 engaged with ring gear 232 of entry assembly 216. At least one fastener 202 secures entry assembly 216 to an entry plate or a receptacle (not shown in FIG. 3A or 3B). Cutter assembly 218 includes a cutter gear 222, a counterweight 224, and a column 226, generally the same as or similar to cutter gear 22 or 122, counterweight 24 or 124, and column 26 or 126 described with reference to FIGS. 1A to 1D and 2A to 2E. Column 226 defines a channel 228 and a tab 230 generally the same as or similar to channel 28 or 128 and tab 30 or 130 described with reference to FIGS. 1A to 1D and 2A to 2E. Tab 230 is configured to receive an end 223 of cutter gear 222. A secondary gear 225 adjacent end 223 of cutter gear 222 engages with ring gear 232, and maintains the revolution or orbit of cutter gear 222 about channel 228 of column 226. Driving assembly 260 drives cutter gear 222 about channel 228.

Thus, sharpeners according to the present disclosure may be used to sharpen writing instruments, and provide relatively easy access for cleaning or maintenance.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sharpener for a writing instrument, the sharpener comprising:
- a receptacle;
- an entry assembly coupled to the receptacle and defining an instrument opening, the entry assembly configured to receive an end of the writing instrument through the instrument opening along an entry axis;
- a cutter assembly configured to revolve about the entry axis in engagement with the entry assembly to sharpen the end of the writing instrument, wherein the cutter assembly is removably engageable with the entry assembly at least by relative translation between the cutter assembly and the receptacle along the entry axis; and
- a cutter platform transverse to the entry axis and opposing the entry assembly, wherein the cutter platform comprises at least one pad biased to remain in contact with an interior surface of the receptacle to secure the cutter platform to the receptacle.

2. The sharpener of claim 1, wherein the cutter assembly comprises a cutter gear configured to revolve about the entry axis in engagement with the entry assembly and in contact with the end of the writing instrument.

3. The sharpener of claim 2, wherein the cutter assembly comprises a counterweight opposing the cutter gear and configured to rotate about the entry axis.

4. The sharpener of claim 2, wherein the cutter assembly comprises a column extending in a direction along the entry axis, wherein the column defines an instrument channel along the entry axis configured to receive the end of the writing instrument.

5. The sharpener of claim 4, wherein an end of the column adjacent the entry assembly defines a tab extending transverse to the entry axis, and wherein the tab retains an end of the cutter gear.

6. The sharpener of claim 2, wherein the entry assembly comprises a ring gear.

7. The sharpener of claim 1, wherein the entry assembly comprises an entry plate transverse to the entry axis and defining the instrument opening.

8. The sharpener of claim 6, wherein the entry assembly comprises an entry plate transverse to the entry axis and defining the instrument opening, and wherein the entry plate is coupled to the ring gear.

9. The sharpener of claim 1, further comprising a base removably coupled to the receptacle and opposing the entry assembly, wherein the cutter assembly is between the base and the entry assembly.

10. The sharpener of claim 9, wherein the base is removably couplable to the receptacle at least by relative translation between the base and the receptacle along the entry axis.

11. The sharpener of claim 1, wherein the cutter assembly extends between the cutter platform and the entry assembly.

12. The sharpener of claim 11, wherein the cutter platform defines a raised boss facing the cutter assembly and configured to retain an end of the cutter assembly opposing the entry assembly, and wherein the raised boss is configured to allow the cutter assembly to rotate in contact with the cutter platform.

13. The sharpener of claim 11, wherein the cutter platform is removably couplable to the receptacle at least by relative translation between the cutter platform and the receptacle along the entry axis.

14. The sharpener of claim 1, wherein the cutter platform comprises at least one press tab coupled to the at least one pad, wherein the at least one press tab extends away from the cutter platform in a direction along the entry axis and opposite the cutter assembly, and wherein the at least one press tab is configured to remove the at least one pad from the contact with the interior surface of the receptacle.

15. The sharpener of claim 14, wherein the base defines at least one slot facing the cutter platform, wherein the at least one slot is configured to receive the at least one press tab for removably coupling the cutter platform to the base at least by relative twisting or relative translation between the cutter platform and the base.

16. The sharpener of claim 6, wherein one or both of the cutter gear and the ring gear comprises a metal or an alloy.

17. The sharpener of claim 6, wherein one or more of the receptacle, column, cutter platform, and the base comprises a plastic.

18. The sharpener of claim 1, wherein the receptacle comprises a transparent or translucent region or window, or wherein the entirety of the receptacle is transparent or translucent.

19. The sharpener of claim 1, comprising a drive assembly configured to drive the cutter assembly to revolve about the entry axis.

* * * * *